United States Patent [19]
Lord et al.

[11] Patent Number: 5,806,327
[45] Date of Patent: Sep. 15, 1998

[54] COMPRESSOR CAPACITY REDUCTION

[76] Inventors: Richard G. Lord, 104 Somerset La., Tullahoma, Tenn. 37388; Kenneth J. Nieva, 7826 Restmoor Dr., Baldwinsville, N.Y. 13027

[21] Appl. No.: 671,922

[22] Filed: Jun. 28, 1996

[51] Int. Cl.⁶ .............................. F25B 39/02; F25B 1/00
[52] U.S. Cl. .............................. 62/115; 62/204; 62/227; 62/DIG. 17
[58] Field of Search ............................ 62/222, 210, 204, 62/228.3, DIG. 17, 227, 115

[56] References Cited

U.S. PATENT DOCUMENTS

| | | | |
|---|---|---|---|
| 3,014,352 | 12/1961 | Leimbach | 62/DIG. 17 |
| 5,477,701 | 12/1995 | Kenyon et al. | 62/210 X |

FOREIGN PATENT DOCUMENTS

6011174   1/1994   Japan ...................................... 62/210

Primary Examiner—William E. Wayner

[57] ABSTRACT

The present invention is a method for operating an air conditioner chiller system under high ambient air conditions. When the temperature of the standard discharge saturation temperature increases above a first predetermined temperature as a result of a rise in ambient air temperature, an expansion valve is throttled to reduce the capacity of the system compressor. The amount of throttling can be made to be dependent on the amount that the discharge temperature exceeds the first predetermined temperature so that compressor capacity is reduced by an amount no more than is necessary to assure that a maximum operating design pressure is not exceeded.

10 Claims, 6 Drawing Sheets

FIG.6

COMPRESSOR CAPACITY REDUCTION

BACKGROUND OF THE INVENTION

1. Field of the Invention

The present invention relates to air cooled air conditioning chiller systems in general, and in particular to a method for operating a chiller system during high ambient air temperature conditions.

2. Background of the Prior Art

When outdoor ambient air temperature increases, the condensing temperature of a chiller system condenser must increase in order to reject the required amount of heat to the outside air. Typically, the saturated discharge (or condensing) temperature increases about 1 deg. F for each 1 deg. F rise in ambient air temperature. By design, chiller systems have a maximum operating pressure and temperature beyond which they cannot operate. Safety codes require that the unit does not operate above a predetermined design pressure. In fact, a high pressure limit switch is required and must be set at 90 percent of the design pressure. All components of an air conditioning unit must be qualified to meet this design pressure.

Existing chiller systems must include a control feature which automatically shuts down a unit when the operating pressure exceed a pressure just below a maximum design limit operating point. In more recent chillers, control features have been implemented wherein individual compressors are shut off or unloaded in response to the condition that a maximum operating point is exceeded. When a compressor is unloaded, its capacity is reduced. Typically, compressor capacity is reduced by disabling a part of the compressor displacement so that actual displacement is decreased. In reciprocating compressors, unloading is accomplished by shutting off flow to one or more cylinders. In screw type compressors unloading is accomplished by bypassing part of the screw compressor rotors, thereby decreasing displacement of the compressor. Compressors typically have one to two unloaders. In the case of a screw compressor, there are two normally stepped unloaders per compressor.

In the type of control method involving compressor unloading, a unit's capacity is stepped down by a standard amount no matter the extent to which pressure requirements of the chiller system exceed the maximum pressure. The result often is that the output of a chiller will fall far short of a demanded output, even in the case where a desired operating point exceeds a maximum operating point by a small amount.

SUMMARY OF THE INVENTION

According to its major aspects and broadly stated, the present invention is a method for gradually reducing the capacity of an air conditioner chiller system in response to an increase in outside ambient air temperature.

In the present invention, cooler pressure is decreased in response to the condition that outside condensing pressure increases above a predetermined amount. When the condensing temperature (and therefore pressure) pressure increases above a predetermined amount, the system expansion valve is adjusted, or throttled, to reduce the suction pressure of the cooler, to thereby reduce the capacity of the system.

The amount of expansion valve throttling, and therefore the amount by which the system capacity is reduced, can be made dependent on the condensing temperature (or pressure) and in particular on the extent to which the condenser saturated discharge temperature exceeds a predetermined threshold level. In this way, system pressure can be reduced by an amount that is no more than is necessary than to avoid operating above the maximum operating pressure. Accordingly, maximum possible comfort and capacity is provided to the customer. These benefits are achieved without stepped unloading or shutting off of a compressor.

In a preferred implementation of the invention, the capacity reduction method described hereinabove is combined with pressure limiting control methodologies of the prior art. When the operating condition (as indicated by the condenser pressure or saturated discharge pressure) is more than a first predetermined amount, but less than a second predetermined amount, the expansion valve is closed, or throttled, by an amount dependent on the operating condition. When the operating condition exceeds a second, but is below a third predetermined level then compressors are unloaded or turned off to effect a stepwise reduction in capacity. When the operating condition exceeds a third predetermined amount corresponding to a maximum design limit operating pressure and temperature, then the chiller system is shut down completely.

BRIEF DESCRIPTION OF THE DRAWINGS

In the drawings, wherein like numerals are used to indicate the same elements throughout the views.

DETAILED DESCRIPTION OF THE PREFERRED EMBODIMENTS

Figure 1:
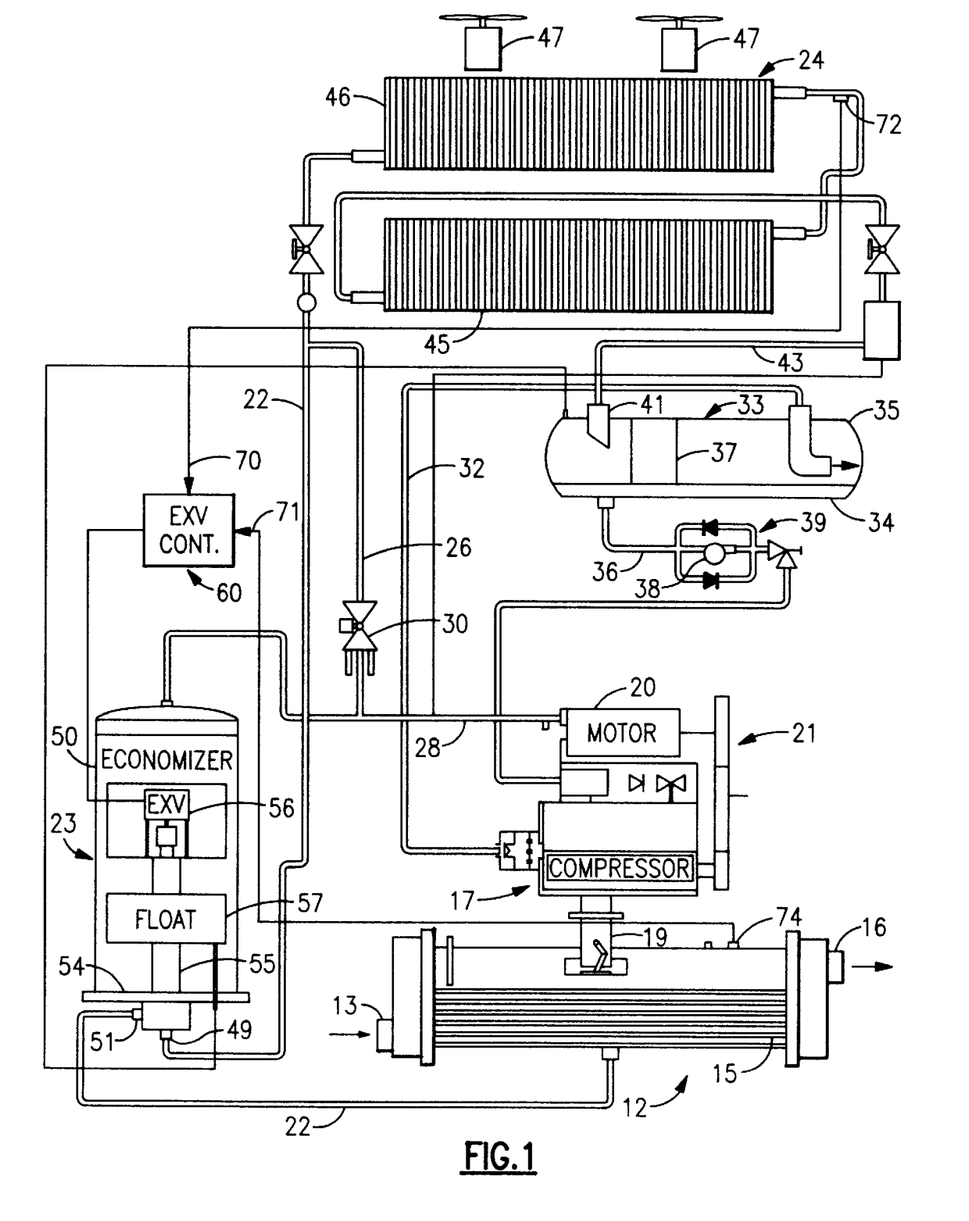
FIG. 1 shows a schematic diagram of a chiller system in which the present invention can be implemented.

A general description of one air conditioning chiller system in which the present invention may be integrated is made with reference to FIG. 1. Chiller system 10, shown in FIG. 1, is typically employed to chill water or other suitable liquids in the system evaporator 12. Water enters the cooler through an inlet port 13 and is circulated through a series of heat exchanger tubes 15 before the water is discharged through an exit port 16. The cooler is flooded with liquid refrigerant at a low temperature which absorbs heat from the water being circulated through the heat exchanger tubes. Accordingly, refrigerant gas is driven off and supplied to the system compressor 17.

The compressor 17 employed in the present invention is a screw compressor. The suction side of the compressor is connected directly to the refrigerant outlet of the cooler through means of a flanged coupling 19. The rotors of the compressor are connected to a drive motor 20 via a gear train 21. As in the case of most screw compressors, lubricating oil is distributed to the rotors and the bearings of the machine and is compressed, along with the refrigerant, to a relatively high temperature and pressure.

As will be explained in greater detail below, the present chiller system is equipped with an economizer 23 located in the liquid line 22 connecting the condenser section 24 and the evaporator section, or cooler 12. In the economizer, a portion of the refrigerant moving between the condenser and the evaporator is reduced to a pressure somewhere intermediate the operating pressures of the condenser and the evaporator. The flash gas that is generated is fed back to the compressor through the compressor motor so that it absorbs heat from the motor to provide cooling to the motor. The vapor leaves the motor and is introduced into the compressor flow at an intermediate point along the compressor flow path.

There is an additional provision provided in the present system for motor cooling. Liquid refrigerant is shunted from the liquid line 22 directly to the flash gas inlet line 28 to the compressor motor by shunt line 26. In the event the motor becomes overly warm, the condition is sensed by the system controller and a solenoid valve 30 in the shunt line is opened and liquid refrigerant supplements the economizer flash gas in providing motor cooling. When a desired motor operating temperature is once again attained, the solenoid valve is closed by the system controller.

In the compressor, the refrigerant vapor is driven to a desired high temperature and pressure. The discharge gas from the compressor is directed via a discharge line 32 to an oil separator 33 wherein the oil contained in the high pressure gas is removed from the refrigerant vapor. The compressor discharge gas enters the top of the separator shell 34 and is directed against the end wall 35 of the shell so that a good deal of the oil separates out of gas and is collected in the bottom of the tank. The remaining compressor gas then flows through a wire mesh screen 37 where the remaining oil is separated and allowed to drain to the bottom of the tank. An oil return line 36 located in the bottom of the tank which returns the oil collected in the tank to the motor under system pressure without the aid of a pump. A small prelube pump 38 is connected in the oil return line by means of a check valve network 39 to insure that sufficient oil pressure is provided to the system at start up. The pump is activated for about twenty seconds prior to starting of the compressor and as soon as the system pressure differential reaches a desired level, the pump is shut down.

Refrigerant vapor leaves the oil separator at the outlet 41 located at the top of the tank and is piped via vapor line 43 to the inlet of the system condenser 24. The condenser section in the present embodiment of the invention includes two fan coil units 45 and 46 that are mounted adjacent to each other in parallel flow relationship. The condenser is an air cooled system wherein a plurality of fans 47—47 are employed to draw ambient air over the heat exchanger fins of the fan coil units. Refrigerant moving through the circuits is reduced to a liquid with the heat of condensation is rejected into the air stream moving over the fan coils.

Liquid refrigerant living in the condenser is piped to the bottom inlet 49 of the economizer 23. The economizer is housed within a vertically disposed steel sheet 50 that is attached to a base 54 containing the refrigerant inlet port 49 and outlet port 51. An interior standpipe 55 routes the incoming refrigerant to an electronically controlled expansion valve (EXV) 56 which is mounted in the upper section of the upright economizer shell. The EXV serves to rapidly expand the incoming liquid refrigerant to a lower intermediate pressure whereupon the vapor produced by the expansion collects in the upper part of the shell chamber while the liquid phase is collected in the bottom of the shell chamber. As noted above, the vapor developed in the top of the shell is passed back to the compressor through the compressor motor by means of gas inlet line 28.

The economizer operates at an intermediate pressure somewhere between the condenser pressure and the evaporator pressure. The liquid that is collected in the bottom of the economizer is throttled a second time through adjustable metering orifices located in a stand pipe 50. Although not shown, a metering sleeve is slidably contained within the standpipe which is arranged to be adjustably positioned by a float 57 to control the opening and closing of metering orifices in response to the liquid level in the chamber. The second throttling process further lowers the pressure and temperature of the refrigerant and generates a lower temperature two phase fluid which is then delivered into the cooler via liquid line 22. The liquid floods the chilled water tubes and because of its lowered temperatures, absorbs heat from the water to lower the water temperature to a desired operating level.

A liquid level sensor is provided in the evaporator cooler which is adapted to send a control signal to the EXV controller 60, which in turn controls the flow of liquid refrigerant to the cooler to maintain the liquid level in the cooler at a desired level.

Figure 2:
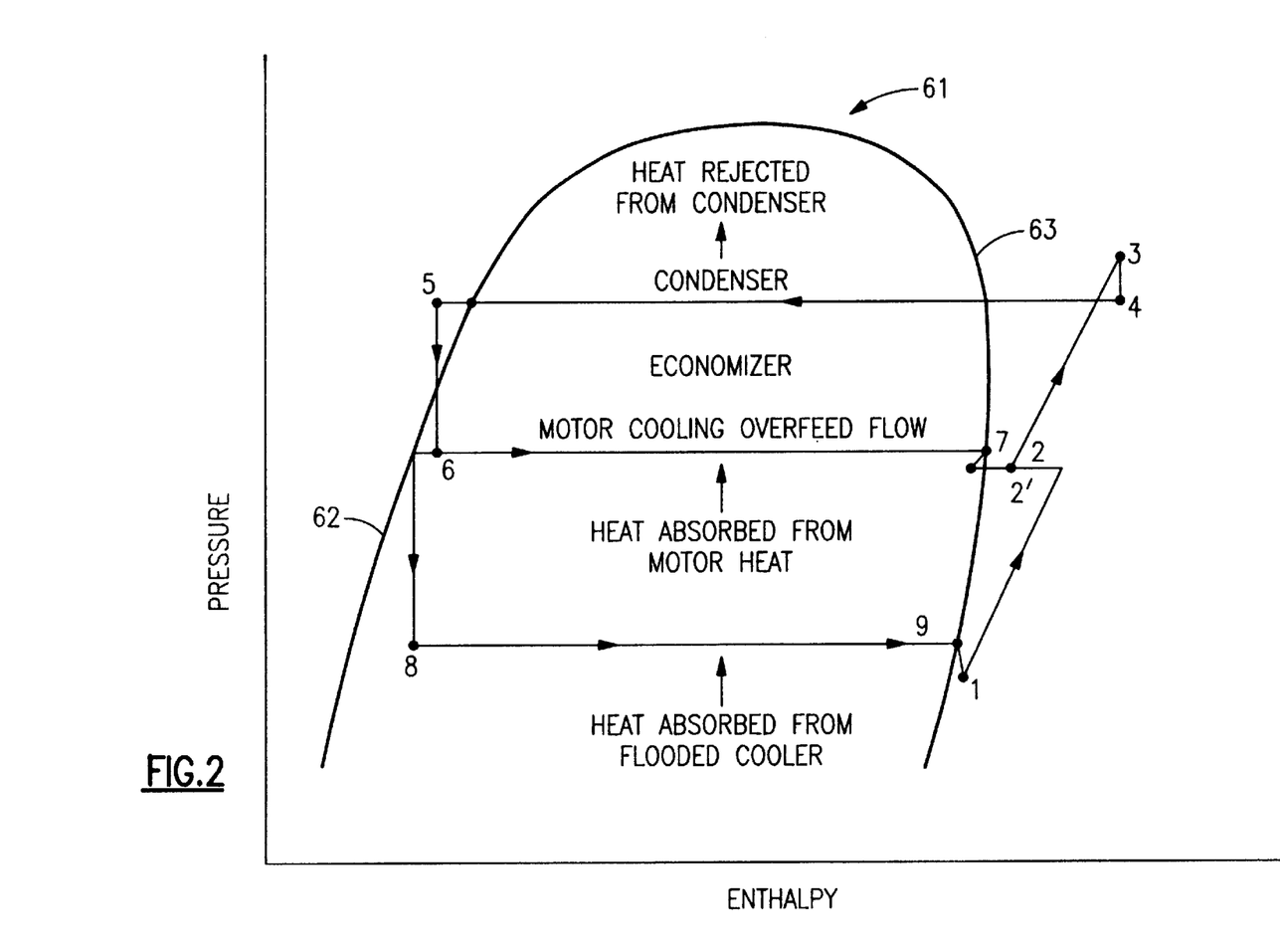
FIG. 2 shows an enthalpy diagram for a chiller system illustrating phase changes in a refrigerant moving through the system.

The thermodynamic cycle of the present chiller system will be explained in further detail with reference to FIG. 2 which shows the phase changes in the refrigerant as it moves through the refrigeration loop. The refrigerant cycle diagram 61 is shown wherein pressure is plotted against enthalpy. The liquid line 62 is depicted on the left hand side of the curve while the vapor line 63 is on the right hand side of the curve. Initially, vapor enters the suction side of the compressor from the evaporator at state point 1 and is compressed to a higher pressure shown at state point 2'. Vapor from the economizer is introduced into the compressor at state point 7 where it is mixed with the in-process vapor causing a slight decrease in energy to state point 2. The compressor continues to produce work on the combined vapor until the vapor reaches discharge pressure at state point 3.

The compressed vapor enters the oil separator at state point 3 wherein the oil is removed from the refrigerant and returned to the compressor. Due to the oil separation procedure, the pressure of the refrigerant vapor drops slightly to state point 4 at the entrance to the condenser.

In the condenser, the refrigerant is reduced from a superheated vapor to a liquid at state point 5 and the heat of condensation is rejected into the air passing through the condenser coils. Liquid refrigerant enters the economizer at state point 5 and undergoes a first adiabatic expansion to state point 6 as it passes through the EXV. As a result, some of the refrigerant is vaporized and returned to the compressor through the compressor motor where it provides some motor cooling. The flash gas enters the compressor at state point 7 where it mixes with the in process vapor at state point 2.

The remaining liquid in the economizer is throttled through float controlled throttling orifices and is delivered to the entrance of the evaporator cooler at state point 8. Here the two phase fluid absorbs heat from the liquid being chilled and is reduced to a vapor at state point 9. The refrigerant vapor at state point 9 is exposed to the suction side of the compressor to complete the cycle.

In the present invention, the capacity of system 10 is decreased in response to a compressor temperature or pressure increase resulting from an increase in outside ambient temperatures above a predetermined amount. As the external ambient increases, the saturated condensing temperature must increase in order to reject the same amount of heat to the ambient air. This results in the saturated condensing temperature increasing at about 1 deg. F saturated condensing temperature for each 1 deg. F rise in ambient air temperature. However, compressors have a maximum operating pressure and temperature beyond which they cannot operate without exceeding design limitations. Reducing the capacity of system 10 allows operation of the unit at higher ambient temperatures.

Capacity herein refers to the cooling effect of evaporator 12 and specifically to the amount of heat absorbed from the water by evaporator 12. In prior art systems, capacity is typically decreased by unloading part of compressor 17. Unloading can be accomplished, for example, by mechanical unloaders or, in the case of a screw compressor, slide valves which shut off part of the compressor pumping or displacement capability.

In the present invention, capacity is reduced by throttling EXV 56. When EXV 56 is throttled the flow of refrigerant into evaporator 12 is reduced to bring about a pressure reduction at compressor inlet 18. Reducing the pressure at compressor inlet 18 reduces the density of the refrigerant entering the compressor, resulting in a reduced mass flow of refrigerant through compressor 17, and hence a capacity reduction.

When EXV 56 is throttled, a stepper motor in valve 56 drives a slider over a set of orifices to decrease the flow area which then decreases the amount of fluid that EXV 56, can feed to evaporator 12. Throttling EXV 56 therefore, reduces evaporator, or cooler suction. Decreasing suction of evaporator 12 decreases suction gas density and increases lift, to thereby decrease capacity. Suction gas density is the amount of refrigerant per cubic feet of volume. As the suction temperature decreases the density decreases. As the compressor pumps a fixed volume of gas then for a lower suction temperature the density of the gas will decrease and the mass flow of the refrigerant will decrease. The capacity of the unit will also decrease since the capacity is dependent on mass flow. Also, as the suction decreases, the lift of the compressor will increase to further decrease the capacity of the compressor. Lift is the difference between the suction and discharge of the compressor.

The amount of heat rejected through condenser 24 can be expressed by the following simplified heat transfer equation:

$$Q = AU\Delta T \qquad \text{eq.1}$$

where Q is the amount of heat rejected, A is the surface area of the condenser, U is the overall heat transfer coefficient, and $\Delta T$ is the temperature difference between the refrigerant and air.

It is seen that the temperature difference, $\Delta T$, between the refrigerant and air decreases with decreasing capacity. With constant ambient air temperature, a decrease in capacity decreases the saturated condensing temperature of the refrigerant. Because the pressure of the refrigerant is a function of the saturation temperature, the condensing pressure will also decrease.

Decreasing the capacity of compressor 17 decreases the demand of the unit. By decreasing capacity, the unit produces less cooling capacity at evaporator 12, resulting in slightly higher cooler water temperatures. The present invention therefore minimizes the amount of capacity loss and water temperature increase at the evaporator.

EXV 56 is throttled in order to reduce the suction pressure of the cooler, to thereby reduce the capacity of the system when the temperature of outside ambient air increases to cause an increase in saturation condensing pressure above a predetermined amount.

The amount of expansion valve throttling, and therefore the amount by which the system capacity is reduced, can be made dependent on saturated discharge temperature, and in particular on the extent to which the saturation temperature exceeds a predetermined threshold level. In this way, system pressure can be reduced by an amount no more than is necessary to avoid operating above the maximum operating pressure limit, and maximum possible comfort is provided to the customer. Skilled artisans will recognize that the throttling of EXV 56 can also be triggered, for example, by the condenser pressure exceeding a predetermined amount, by the outside ambient temperature exceeding a predetermined amount, or by another system component pressure exceeding a predetermined amount.

A convenient method for throttling EXV 56 is to decrease the maximum operating pressure (MOP) setpoint for evaporator 12. EXV is controlled by controller 60, which may comprise a microprocessor based control system. When a decreased MOP pressure setpoint is input into controller 60, controller 60 throttles EXV 56 by an amount necessary to lower the evaporator pressure to the decreased MOP setpoint based on a feedback signal from evaporator 12 indicative of evaporator pressure, which is also input into controller 60. This feedback signal may be provided, for example, by pressure transducer 74. The amount of throttling could also be made dependent on other criteria, for example, on the temperature of the ambient air.

Figure 4:
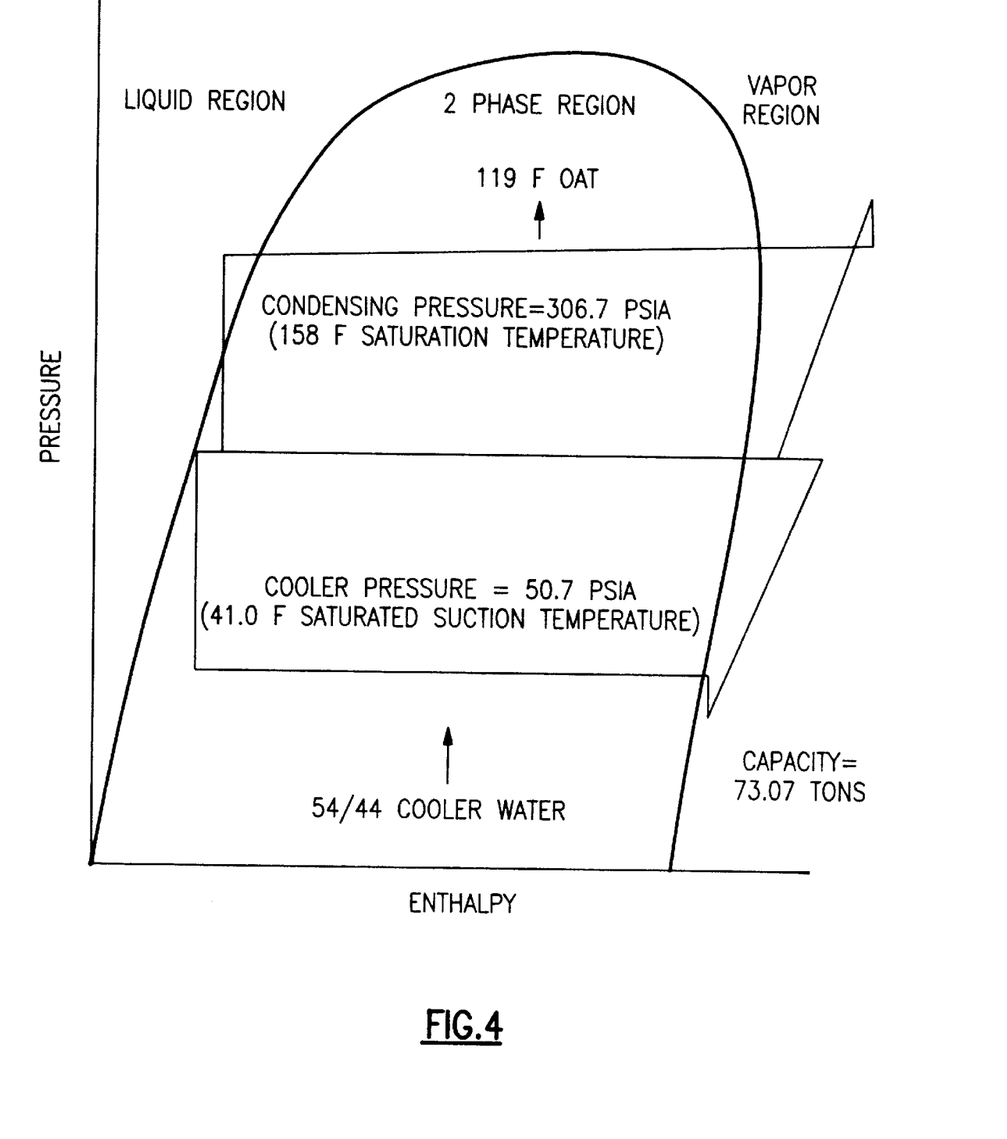
FIG. 4 shows an enthalpy diagram for a chiller system corresponding to a maximum full load operating condition.
Figure 5:
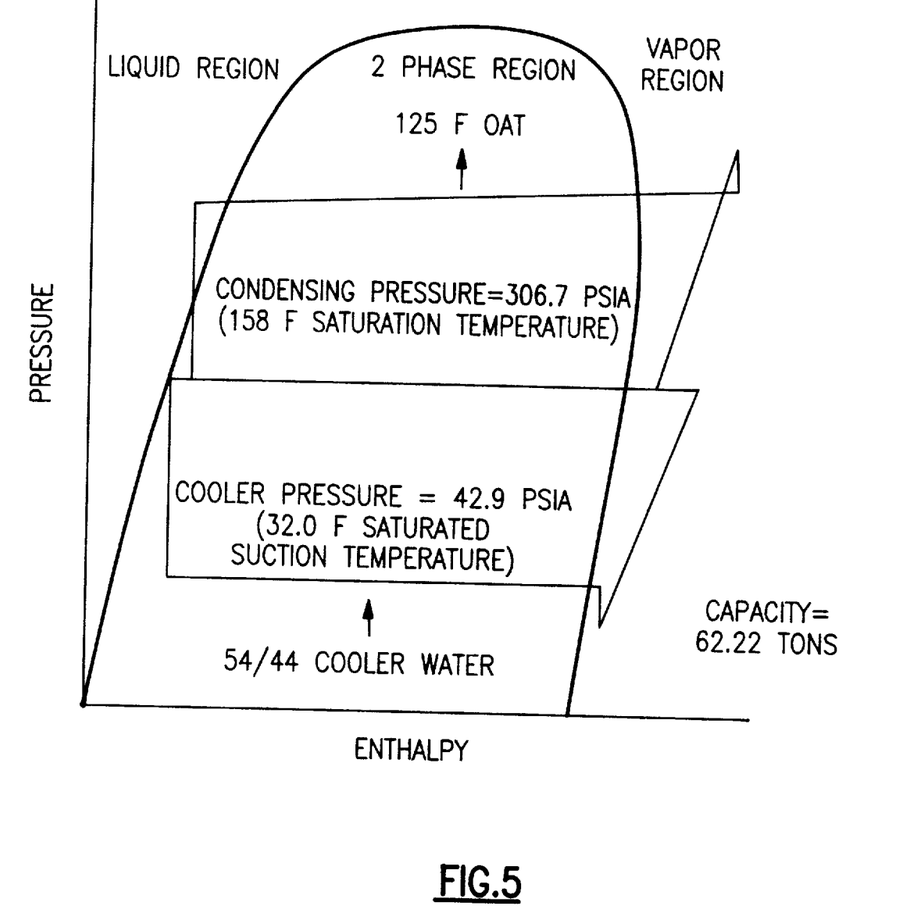
FIG. 5 shows an enthalpy diagram for a chiller system corresponding to a maximum operating ambient, reduced load operating condition.
Figure 6:
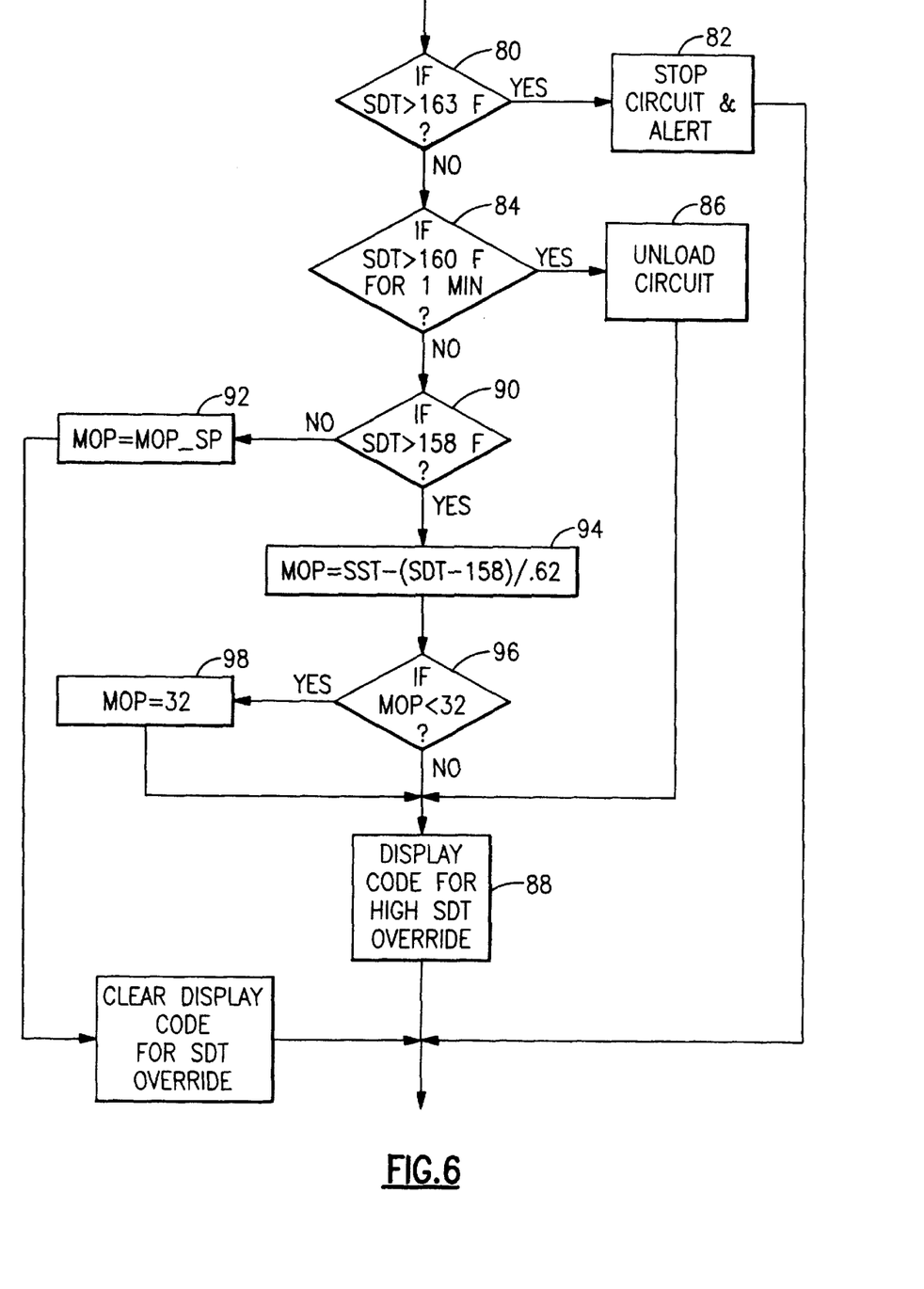
FIG. 6 is a flow chart illustrating one preferred implementation of the present invention.

Operation of the present invention can be well understood with reference to FIGS. 4 through 6 which show enthalpy diagrams for chillers corresponding to various operating conditions.

Figure 3:
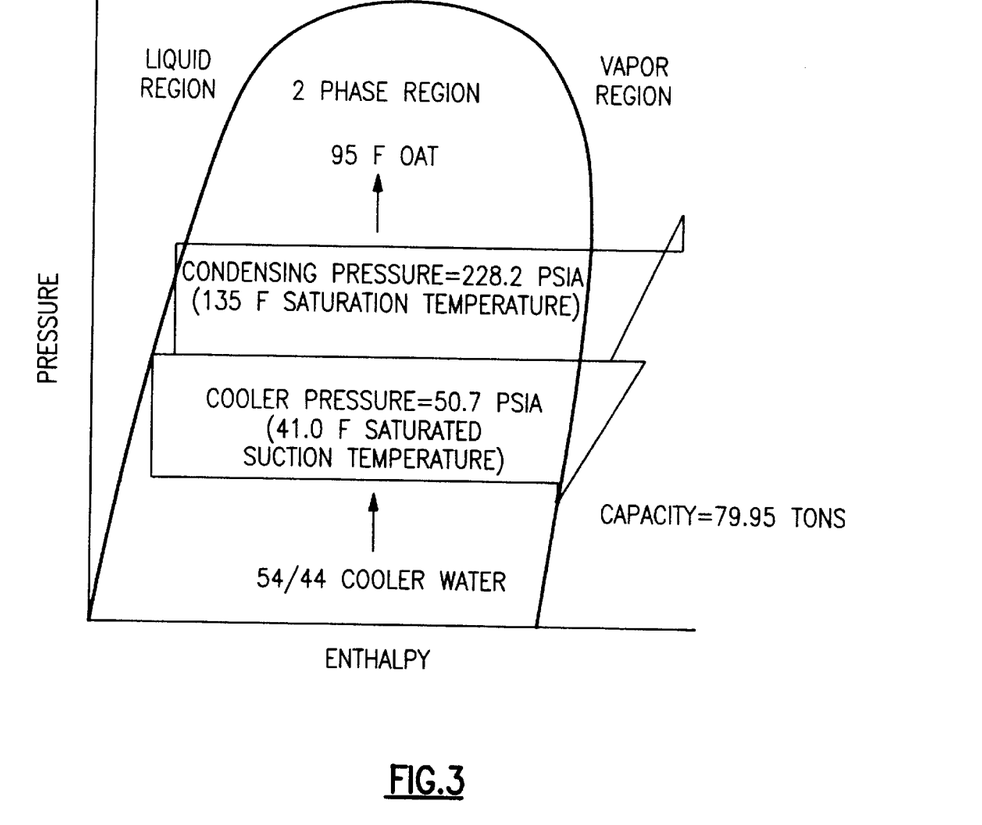
FIG. 3 shows an enthalpy diagram for chiller system corresponding to a design point operating condition.

FIG. 3 is an enthalpy diagram for a chiller operating at a design point operating condition. In the example shown, the unit is configured to remove heat from a building during 95° F. outside ambient air conditions. It is seen that cooler pressure balances at a level of 50.7 PSIA, or 41.0° F., while condensing pressure balances at 228.2 PSIA, 135° F.

FIG. 4 is an enthalpy diagram for a chiller operating in a maximum full load operating condition, wherein outside ambient air temperature is 119° F. In this case, cooler pressure remains at 50.7 PSIA, 41.0° F., but the output of compressor 17 is increased so that condenser is at an operating point of 306.7 PSIA, 158° F., sufficient to remove equivalent amounts of heat from a system.

FIG. 5 is an enthalpy diagram for a chiller operating at a maximum operating ambient, reduced load condition. In this case, it is seen that cooler pressure is reduced, normally by throttling EXV 56, to a reduced operating point of 42.9 PSIA, 32.0° F. saturated suction temperature. Reducing cooler pressure reduces the capacity of compressor 17. Comparing FIGS. 3 and 4, it is seen that capacity depends on the difference between cooler and condenser pressure (lift) and that capacity decreases with increased lift. Compare FIGS. 4 and 5, it is seen that capacity is also dependent on cooler suction pressure.

Also by comparing FIGS. 4 and 5 it is seen that when EXV 56 is throttled, condensing pressure remains at the same operating point as in the maximum full load operating point, shown in FIG. 4.

However, capacity is reduced just enough to accomplish the maintenance of the same condensing pressure while operating at a higher ambient temperature. In the sample discussed in connection with FIG. 6, the amount of EXV throttling is controlled to maintain the MOP setpoint at 158 of saturated condensing temperature, which is just below the design limit temperature. Thereby, capacity is decreased by an amount no more than is necessary to avoid exceeding said maximum design limit pressure.

In one implementation of the invention, the proportional capacity reduction control method described is combined with the pressure-limiting control methodologies of the prior art. When the condenser saturation temperature is more than a first predetermined amount, but less than a second predetermined amount, expansion valve 56 is throttled by an amount dependent on the saturated condensing temperature. When the saturated condensing temperature exceeds a second, but is below a third predetermined temperature then compressor unit or units are unloaded or turned off to effect a stepwise reduction in capacity. When operating temperature exceeds a third predetermined temperature corresponding to a maximum operating pressure and temperature, then chiller system 10 is shut down completely.

Implementation of the present invention according to the above methodology is described in detail with reference to the flow diagram of FIG. 7, describing steps of an algorithm carried out by EXV controller 60, which generates a setpoint control signal to EXV 56, indicating a desired setpoint pressure for evaporator 12. EXV 56 controller 60 has input thereto inputs 70, 71 indicative of saturated discharge temperature and economizer pressure, respectively. Input 70 may be generated, for example, by pressure transducer or thermistor located in the condensing screw of condenser coil 24. Input 71 is preferably provided by pressure transducer 74, but may also be provided by a thermistor.

In step 80 controller 60 determines whether the condenser saturation temperature, or saturated discharge temperature (SDT) is above a third predetermined temperature corresponding to a maximum allowable design pressure for chiller system 10. In the example shown, this maximum SDT is 163° F. If the SDT is above a third predetermined temperature, then system 10 is shut down at step 82, and an alert indication is made.

If the SDT is below a third predetermined maximum, controller 60 determines, at step 84 whether the SDT is above a second predetermined temperature, e.g. 160° F. Controller at step 84 may determine whether the SDT is above a second predetermined temperature for a predetermined period, such as for 1 minute. If the SDT is above a second predetermined temperature but below a third predetermined temperature then controller 60 executes step 86 to shut off or unload a compressor unit effecting a stepwise reduction in capacity. An indication is made at step 68 indicating that a system is operating under a high ambient operating condition.

If the SDT is below a second predetermined temperature, then controller 60, at step 90 determines whether the SDT is below a first predetermined temperature. If the SDT is below a first predetermined temperature and above a second predetermined temperature then step 92 is executed to generate a control signal which sets the maximum operating pressure for EXV 56 at a standard setpoint value, e.g. 52° F. saturation temperature as shown in FIGS. 4 and 5.

If the SDT is between first and second predetermined temperatures, then controller 60 at step. 94 generates a control signal for input to EXV 56 which sets a MOP pressure setpoint for EXV 56 according to the following formula:

$$\text{MOP}=\text{SST}-(\text{SDT}-158)/0.62 \qquad \text{eq.2}$$

Where SST in the saturated suction temperature, eq. 2 was developed using simulation programs and test results. Essentially, the formula develops a correction factor that is subtracted from the current value of SST to develop an adjusted MOP setpoint.

If the MOP derived according to Eq. 2, however, is less than a first predetermined low operating limit pressure (step 96), then the MOP is set: to the low operating limit pressure, e.g. 32 PSIA at step 98. This is to prevent localized freezing of water in the cooler.

The first, second, and third predetermined temperatures referred to above do not bear a critical relationship to one another. In general, however, the third predetermined temperature will be about the temperature corresponding to the maximum possible design limit system pressure, the second predetermined temperature will be a few (e.g. between about 0 and 5) degrees below the third predetermined temperature, and the first predetermined temperature will be a few degrees (e.g. between about 0 and 5) degrees below the second predetermined temperature.

While the present invention has been explained with reference to a number of specific embodiments, it will be understood that the spirit and scope of the present invention should be determined with reference to the appended claims.

What is claimed is:

1. A method for operating art air conditioner chiller system having a compressor, a condenser, an evaporator an expansion valve, and a maximum design limit operating pressure, said method comprising the steps of:

monitoring a saturated discharge temperature for said system to determine whether said saturated discharge temperature exceeds a first predetermined temperature; and upon the condition that said first predetermined temperature is exceeded, throttling said expansion valve by reducing a maximum operating pressure set point for said evaporator to thereby reduce the capacity of said compressor so that said maximum operating pressure is not exceeded.

2. The method according to claim 1, wherein said monitoring step includes the step of determining a difference amount by which said saturated discharge temperature exceeds said first predetermined temperature, and wherein said reducing step includes the step of throttling said expansion valve by an amount dependent on said difference amount so that, in said reducing step, said capacity is decreased by an amount not more than is necessary to avoid exceeding said maximum design limit operating pressure.

3. A method for operating an air conditioner chiller system having a compressor, a condenser, an expansion valve, and a maximum design limit operating pressure, said method comprising the steps of:

monitoring an operating condition for said system to determine whether said operating condition exceeds a first predetermined level; and upon the condition that said first predetermined level is exceeded, throttling said expansion valve by reducing a maximum operating pressure set point for said evaporator to thereby reduce the capacity of said compressor so that said maximum operating pressure is not exceeded.

4. The method according to claim 3, wherein said monitoring step includes the step of determining a difference amount by which said operating condition exceeds said first predetermined level; and wherein said reducing step includes the step of throttling said expansion valve by an amount dependent on said difference amount so that, in said reducing step, said capacity is decreased by an amount not more than is necessary to avoid exceeding said maximum design limit operating pressure.

5. A method for operating an air conditioner chiller system having a compressor, a condenser, an expansion valve, and a maximum design limit operating pressure, said method comprising the steps of:

monitoring a saturated discharge temperature for said system; and upon the condition that said saturated discharge temperature is between a first predetermined temperature and a second predetermined temperature,
reducing the capacity of said compressor so that said maximum operating pressure is not exceeded;

upon the condition that said saturated discharge temperature is between said second predetermined temperature and a third predetermined temperature,
decreasing the loading of said compressor;

upon the condition that said saturated discharge temperature exceeds said third predetermined temperature,
shutting down said system.

6. The method of claim 5, wherein said reducing step includes the step of throttling said expansion valve.

7. The method of claim 6 wherein said system further has an evaporator and wherein said expansion valve is throttled by reducing a maximum operating pressure (MOP) setpoint for said evaporator.

8. The method according to claim 5, wherein said monitoring step includes the step of determining an difference amount by which said saturated discharge temperature exceeds said first predetermined temperature, and wherein said reducing step includes the step of throttling said expansion valve by an amount dependent on said difference amount so that, in said reducing step, said capacity is decreased by an amount not more than is necessary to avoid exceeding said maximum design limit pressure.

9. The method of claim 5, wherein said decreasing step includes the step of unloading said compressor.

10. The method of claim 5, wherein said third predetermined temperature is a saturated discharge temperature corresponding to a maximum design limit saturated discharge pressure for said system.

* * * * *